United States Patent
Feeley et al.

(10) Patent No.: US 11,453,491 B2
(45) Date of Patent: Sep. 27, 2022

(54) DUCT VANE ROTATION SYSTEM

(71) Applicant: Bell Textron Inc., Fort Worth, TX (US)

(72) Inventors: Elizabeth Feeley, Dallas, TX (US); Karl H. Schroeder, Southlake, TX (US); George Matthew Thompson, Lewisville, TX (US); Michael Mark Attaway, Arlington, TX (US); Joseph Richard Carpenter, Jr., Burleson, TX (US)

(73) Assignee: Textron Innovations inc., Providence, RI (US)

( * ) Notice: Subject to any disclaimer, the term of this patent is extended or adjusted under 35 U.S.C. 154(b) by 67 days.

(21) Appl. No.: 17/173,860

(22) Filed: Feb. 11, 2021

(65) Prior Publication Data
US 2021/0394899 A1  Dec. 23, 2021

Related U.S. Application Data

(63) Continuation-in-part of application No. 16/903,831, filed on Jun. 17, 2020, now Pat. No. 11,203,426.

(51) Int. Cl.
| | |
|---|---|
| *B64C 11/00* | (2006.01) |
| *B64C 27/82* | (2006.01) |
| *B64C 29/00* | (2006.01) |
| *F01D 5/02* | (2006.01) |
| *F04D 29/54* | (2006.01) |
| *F01D 9/04* | (2006.01) |

(52) U.S. Cl.
CPC ............ *B64C 29/0033* (2013.01); *F01D 5/02* (2013.01); *F01D 9/041* (2013.01); *F04D 29/545* (2013.01); *F05D 2220/90* (2013.01); *F05D 2240/20* (2013.01)

(58) Field of Classification Search
CPC ............ B64C 27/20; B64C 2027/8254; B64C 2027/8272; B64C 11/001; B64C 9/38
See application file for complete search history.

(56) References Cited

U.S. PATENT DOCUMENTS

| | | | | |
|---|---|---|---|---|
| 2,953,320 A | * | 9/1960 | Parry | B64C 39/06 |
| | | | | D12/325 |
| 3,222,012 A | * | 12/1965 | Piasecki | B64C 27/82 |
| | | | | 244/51 |
| 3,260,482 A | * | 7/1966 | Stroukoff | B64C 27/82 |
| | | | | 244/17.19 |
| 4,795,111 A | * | 1/1989 | Moller | B64C 27/00 |
| | | | | 244/100 R |
| 5,131,603 A | * | 7/1992 | Meyers | B64C 27/82 |
| | | | | 244/110 B |

(Continued)

*Primary Examiner* — Brian M O'Hara
(74) *Attorney, Agent, or Firm* — Akona IP PC

(57) ABSTRACT

One embodiment is a rotor system comprising a duct ring; a hub disposed centrally to the duct ring; first and second stators each connected between the duct ring and the hub; first and second control vanes rotatably connected to the first and second stators, respectively; a structural hoop having a first end connected to the first control vane and a second end connected to the second control vane, the structural hoop for translating rotation of the first control vane about a vane axis to the second control vane; and a mechanism for restricting at least one of forward-aft movement and side-to-side movement of the structural hoop relative to the duct ring.

20 Claims, 17 Drawing Sheets

(56) References Cited

U.S. PATENT DOCUMENTS

| | | | | | |
|---|---|---|---|---|---|
| 5,170,963 | A | * | 12/1992 | Beck, Jr. | B64C 39/064 244/73 C |
| 5,277,381 | A | * | 1/1994 | Piasecki | B64C 27/82 244/17.19 |
| 5,421,538 | A | * | 6/1995 | Vassa (Suratano Thienphropa) | B64C 27/20 244/23 B |
| 6,607,162 | B2 | * | 8/2003 | Warsop | B64C 39/062 244/12.6 |
| 7,281,680 | B2 | * | 10/2007 | Melkuti | B64C 29/0025 244/12.5 |
| 8,464,978 | B2 | * | 6/2013 | Yim | B64C 27/20 244/17.23 |
| 8,511,602 | B2 | * | 8/2013 | Campbell | B64C 27/20 244/175 |
| 9,950,789 | B2 | * | 4/2018 | Tsunekawa | B64C 29/0033 |

* cited by examiner

DUCT VANE ROTATION SYSTEM

CROSS-REFERENCE TO RELATED APPLICATION

This application is a continuation-in-part and claims the benefit of priority under 35 U.S.C. § 120 of U.S. patent application Ser. No. 16/903,831, filed on Jun. 17, 2020, entitled "DUCT VANE ROTATION SYSTEM." The disclosure of the prior application is considered part of and is incorporated by reference in its entirety into the present disclosure.

TECHNICAL FIELD

This disclosure relates in general to the field of aircraft and, more particularly, though not exclusively, to a duct vane rotation system for such aircraft.

BACKGROUND

Ducted-rotor aircraft have at least one ducted rotor for providing lift and propulsion forces. Each ducted rotor typically has internal structure that supports a motor of the aircraft and an aerodynamic exterior skin.

SUMMARY

One embodiment is a rotor system comprising a duct ring; a hub disposed centrally to the duct ring; first and second stators each connected between the duct ring and the hub; first and second control vanes rotatably connected to the first and second stators, respectively; a structural hoop having a first end connected to the first control vane and a second end connected to the second control vane, the structural hoop for translating rotation of the first control vane about a vane axis to the second control vane; and a mechanism for at least one of restricting forward-aft movement and side-to-side movement of the structural hoop relative to the duct ring.

Another embodiment is an aircraft comprising a fuselage; and a rotor system comprising a duct ring; a hub disposed centrally to the duct ring; first and second stators each connected between the duct ring and the hub; first and second control vanes rotatably connected to the first and second stators, respectively; a structural hoop having a first end connected to the first control vane and a second end connected to the second control vane, the structural hoop for translating rotation of the first control vane about a vane axis to the second control vane; and a mechanism for restricting at least one of forward-aft movement and side-to-side movement of the structural hoop relative to the duct ring.

Yet another embodiment is a ducted rotor comprising first and second control vanes rotatable about a hinge line axis; a structural hoop having a first end connected to the first control vane and a second end connected to the second control vane, the structural hoop for translating rotation of the first control vane about a vane axis to the second control vane; and a mechanism for restricting rotation of the structural hoop about the hinge line axis.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
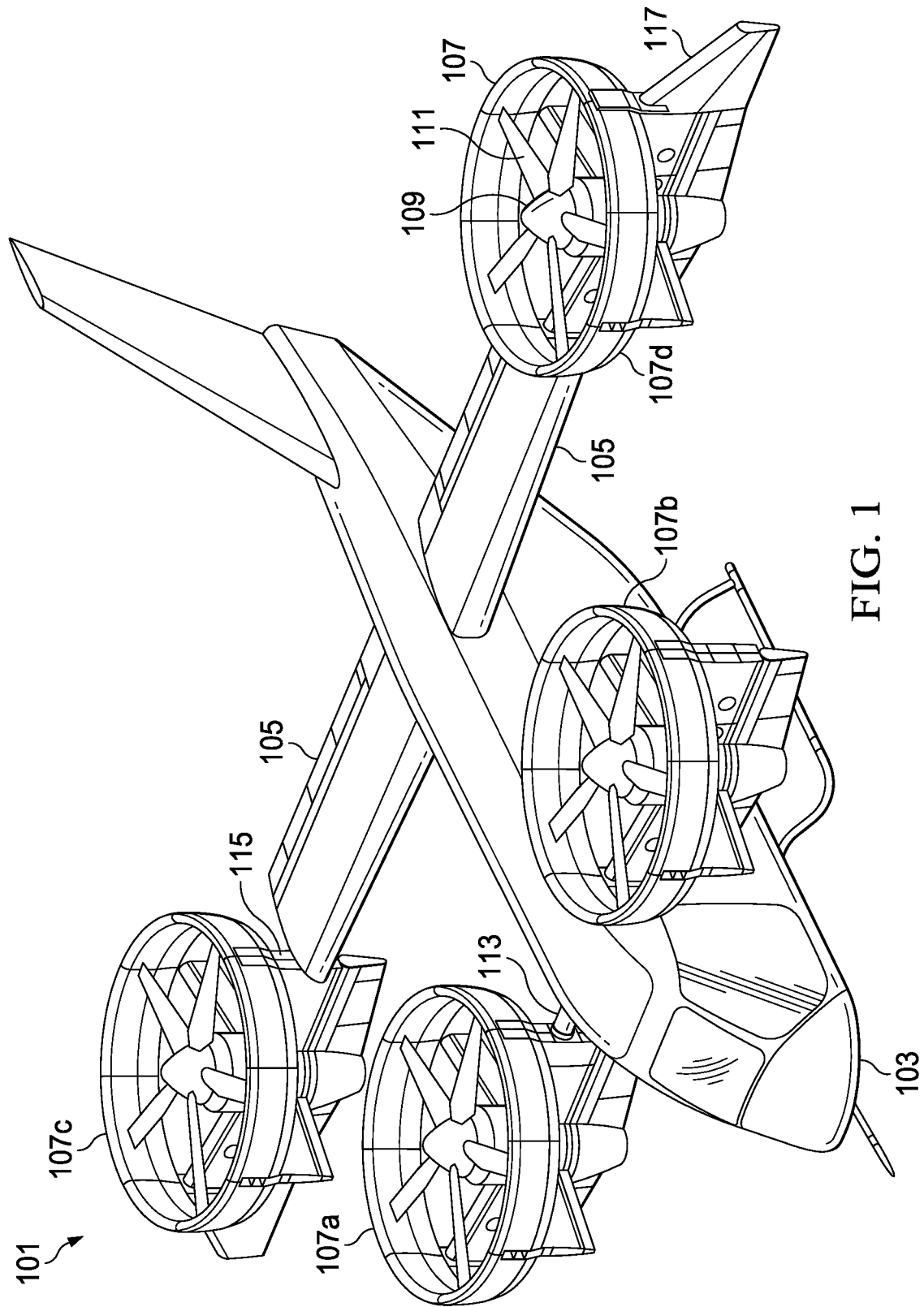
FIGS. 1 and 2 illustrate perspective views of an example tiltrotor aircraft in which a duct vane rotation system in accordance with embodiments described herein may be implemented and showing the aircraft configured to operate in a helicopter mode and an airplane mode, respectively.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect (s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein are embodiments of a duct vane rotation system for a ducted fan rotor including two duct vane fittings with spherical bearings are joined together by a structural hoop to allow for rotation of both vanes. In one embodiment, vanes rotate about a hinge line axis, while the structural hoop translates up and down to carry motion. A fixed-point idler connects to the structural hoop to restrict forward-aft movement thereof relative to the duct (with "forward movement" being defined as toward the front of the duct and "aft movement" being defined as toward the rear of the duct). Structural hoop rotation about the vane hinge line axis is prevented, thereby saving space in the center body of the duct where the structural hoop is located.

In an alternative embodiment, vanes rotate about a hinge line axis and each vane linkage carries the up-down motion caused by rotation of the vane through a bell crank to a torque tube. The torque tube rotates and carries the motion to the opposite bell crank, vane linkage, and vane. A pillow block fixes the torque tube to its axis of rotation. Both of the aforementioned embodiments allow for vane rotation of approximately +/−25 degrees about the hinge line axis.

Figure 2:
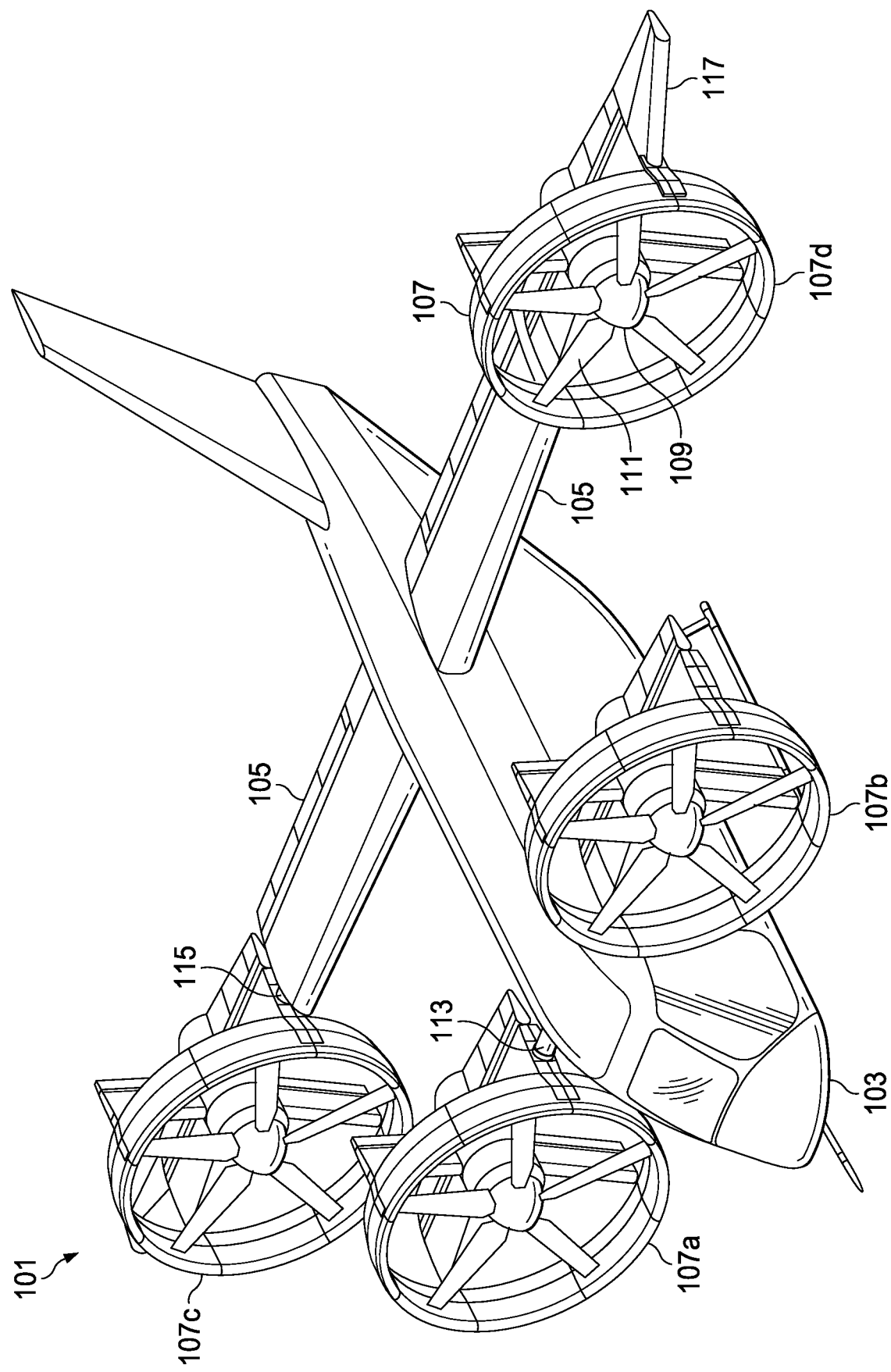

FIGS. 1 and 2 illustrate an example tiltrotor aircraft 101 that includes ducted rotors (or fans). Tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing.

Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducts 107 may be tiltable between the vertical and horizontal positions by spindles 113, 115, which are rotatable in response to commands originating from a pilot and/or a flight control system of the aircraft 101.

Figure 3:
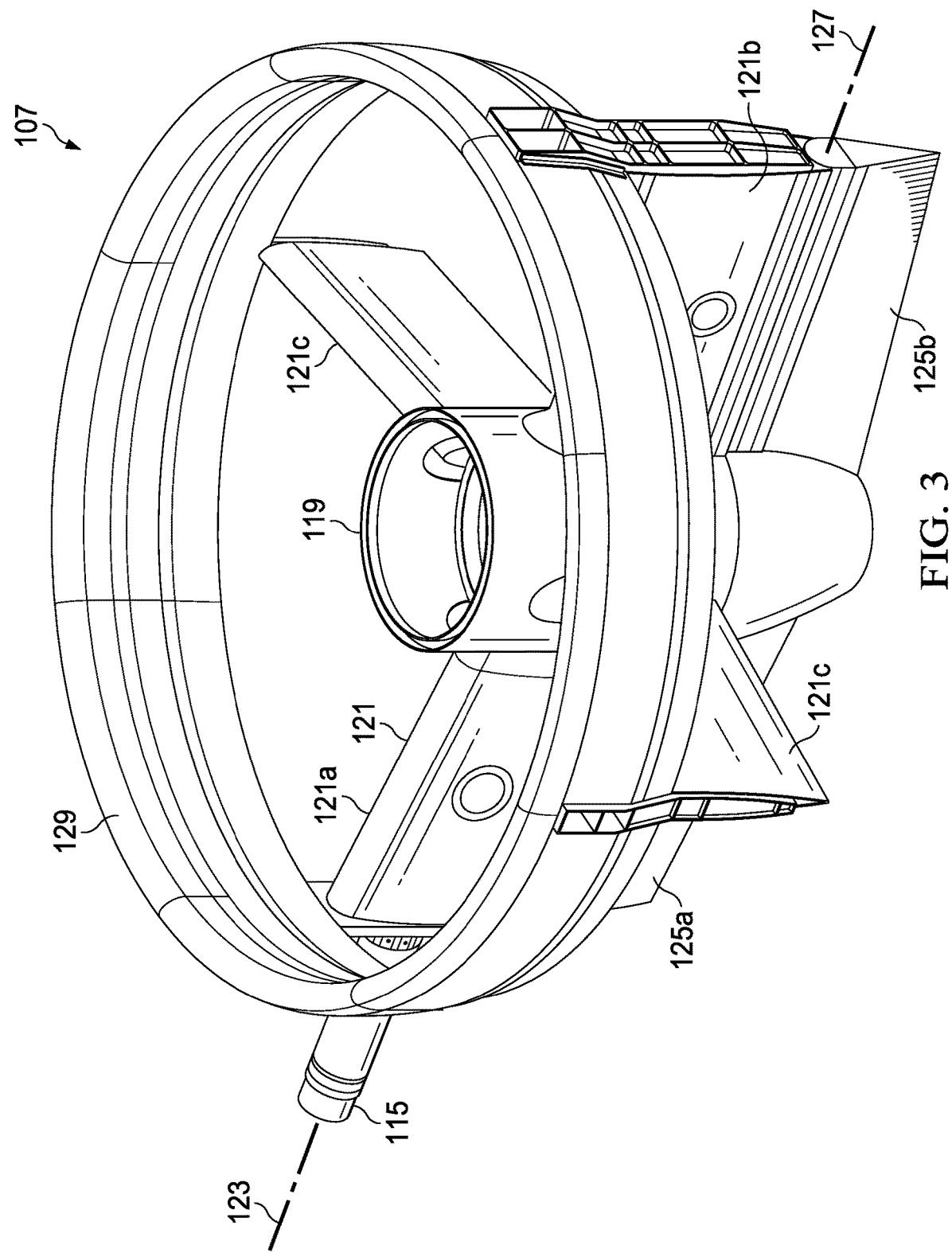
FIG. 3 illustrates a perspective view of a duct of the aircraft depicted in FIGS. 1 and 2.

FIG. 3 is a top perspective view of duct 107 without rotor 109. Duct 107 includes a central hub 119 that is configured to support and house a rotor 109 and/or other components. Duct 107 further includes a plurality of stators 121 that extend outwardly from hub 119. In this embodiment, duct 107 includes four stators 121 that extend radially outward from hub 119. More specifically, duct 107 has two primary stators that include an inboard primary stator 121a and an outboard primary stator 121b. Inboard primary stator 121a is configured to be coupled to a corresponding spindle, such as spindle 113 or spindle 115. Each duct 107 is rotatable about a spindle axis 123 that is defined by spindle 113 or spindle 115. Duct 107 also has two secondary stators 121c. Primary inboard and outboard stators 121a, 121b respectively are configured to carry a larger proportion of the load of duct 107 back to fuselage 103 than are secondary stators 121c. As shown, inboard primary stator 121a and outboard primary stator 121b are longitudinally aligned relative to each other on opposed sides of hub 119 and secondary stators 121c are longitudinally aligned relative to each other on opposed sides of hub 119 and aligned perpendicularly to inboard primary stator 121a and outboard primary stator 121b. In this regard, stators 121 are equally spaced about hub 119. It should be appreciated that duct 107 may be alternatively configured with more or fewer stators 121. It should further be appreciated that duct 107 may be alternatively configured with different spacing of stators 121 about hub 119.

Duct 107 further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, and as will be described in greater detail hereinbelow, inboard control vane 125a and outboard control vane 125b are configured to rotate together to facilitate yaw control, changes of direction, turning, etc. during flight of aircraft 101. In certain embodiments, an actuator is provided in connection with one of the control vanes (e.g., outboard control vane 125b) for directly controlling rotation of the vane, with the rotation being translated to the other control vane (e.g., inboard control vane 125a) by a duct vane rotation system such as that described hereinbelow. It should further be appreciated that duct 107 is not limited to the illustrated configuration of inboard control vane 125a and outboard control vane 125b. For example, duct 107 may alternatively be configured with additional pairs of control vanes. Duct 107 may include one or more sections of skin 129 that form an aerodynamic outer covering of duct 107, and that define an opening that extends through duct 107. As shown, hub 119 is located primarily aft of the opening.

Figure 4:
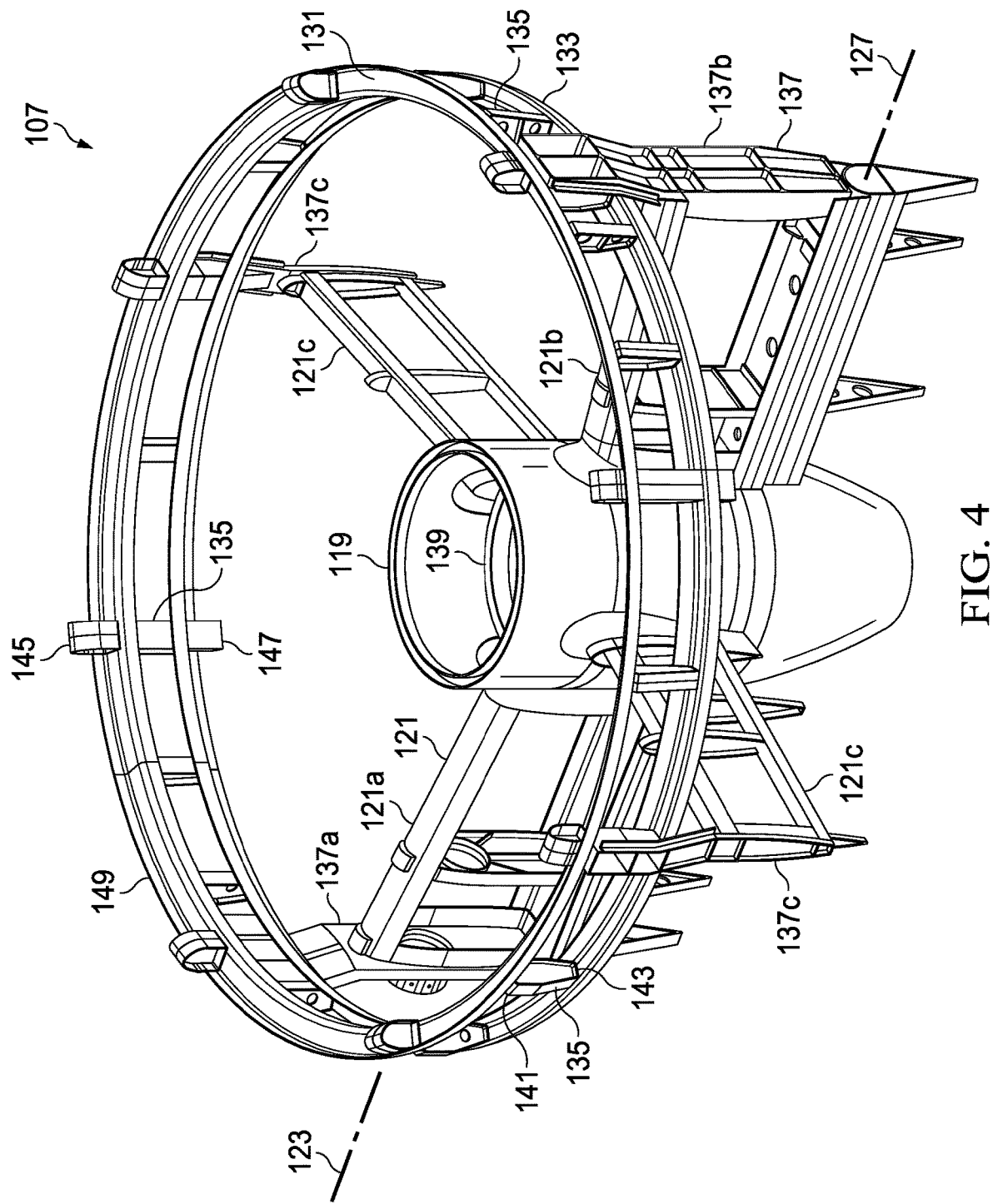
FIG. 4 illustrates a top perspective view of the duct depicted in FIG. 3 with an outer skin removed to illustrate internal components of the duct.

FIG. 4 is a top perspective view of duct 107 with aerodynamic exterior skin pieces, including skin 129, removed to illustrate inner components of duct 107. Duct 107 has a structural framework comprised of structural members. Included among structural members of duct 107 are hub 119, stators 121, an annular forward spar 131, an annular aft spar 133, a plurality of ribs 135, a plurality of fittings 137, and an inner hub assembly 139. Hub assembly 139 is configured for the attachment of a motor (not shown) thereto that drives rotor 109 and configured to facilitate the attachment thereto of other components of duct 107, such as stators 121, mechanisms for adjusting rotor pitch of blades 111, and so on.

Each rib 135 defines an upper end 141 and an opposed lower end 143. The upper end 141 of each rib 135 is configured to attach to forward spar 131, and the lower end 143 of each rib 135 is configured to attach to aft spar 133. As shown, ribs 135 may be configured with differing geometries relative to each other. For example, certain ones of ribs 135 may define one or more apertures that extend therethrough. It should be appreciated that duct 107 is not limited to the illustrated configuration of ribs 135. For example, duct 107 may be implemented with more or fewer ribs and/or with ribs having the same or different geometries as compared to ribs 135.

In the illustrated embodiment, duct 107 includes four fittings 137. Each fitting 137 is configured to couple to a second end of a corresponding stator 121. More specifically, duct 107 includes an inboard primary stator fitting 137a that is couplable to a second end of inboard primary stator 121a, an outboard primary stator fitting 137b that is couplable to a second end of outboard primary stator 121b, and two secondary stator fittings 137c that are couplable to respective second ends of secondary stators 121c. The opposed first end of each stator 121 is configured to be coupled to hub assembly 139.

In the illustrated embodiment, the structural members of duct 107 further include upper braces 145 and lower braces 147. Upper braces 145 are attached to forward spar 131 and are configured to support corresponding portions of skin 129. As shown, duct 107 includes eight upper braces 145 that are equally spaced apart around forward spar 131, attached to forward spar 131 at locations above every fitting 137 and at midpoints between adjacent fittings 137. Lower braces 147 are attached to aft spar 133 and are configured to support corresponding portions of skin 129. As shown, duct 107 includes four lower braces 147 that are spaced apart around aft spar 133, attached below corresponding upper braces 145. As shown, ribs 135 that are disposed between an upper brace 145 and a lower brace 147 may be wider than others of the plurality of ribs 135.

When assembled, as shown in FIG. 4, forward spar 131, aft spar 133, ribs 135, fittings 137, upper braces 145, and lower braces 147 together comprise a first structural portion of duct 107 that defines a duct ring 149 of duct 107. Duct ring 149 further includes one or more sections of skin 129.

As shown, duct ring 149 surrounds a portion of hub 119 and defines a passage through which air moves through duct ring 149. Hub 119, stators 121, and control vane 125 together comprise a second structural portion of duct 107 that supports a motor (not shown) and rotor 109.

When ducts 107 of aircraft 101 are positioned as shown in FIG. 2 with blades 111 of rotors 109 rotating, air will move into duct rings 149 of ducts 107 past forward spars 131 as rotors 109 generate thrust that causes aircraft 101 to move in a forward direction. As air moves through ducts 107 while blades 111 of rotors 109 are rotating, the air will move past aft spars 133 and be exhausted over control vanes 125 and away from ducts 107, for example in an aft direction as aircraft 101 moves in a forward direction. In this regard, control vanes 125 are mounted aft of blades 111 of rotors 109.

One or both of forward spar 131 and aft spar 133 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 131 and aft spar 133 may be constructed from one or more layered plies of carbon-fiber-reinforced plastic (CFRP). It should be appreciated that duct 107 is not limited to an implementation having two spars such as forward spar 131 and aft spar 133. For example, duct 107 may be alternatively implemented with more or fewer spars.

Figure 5:
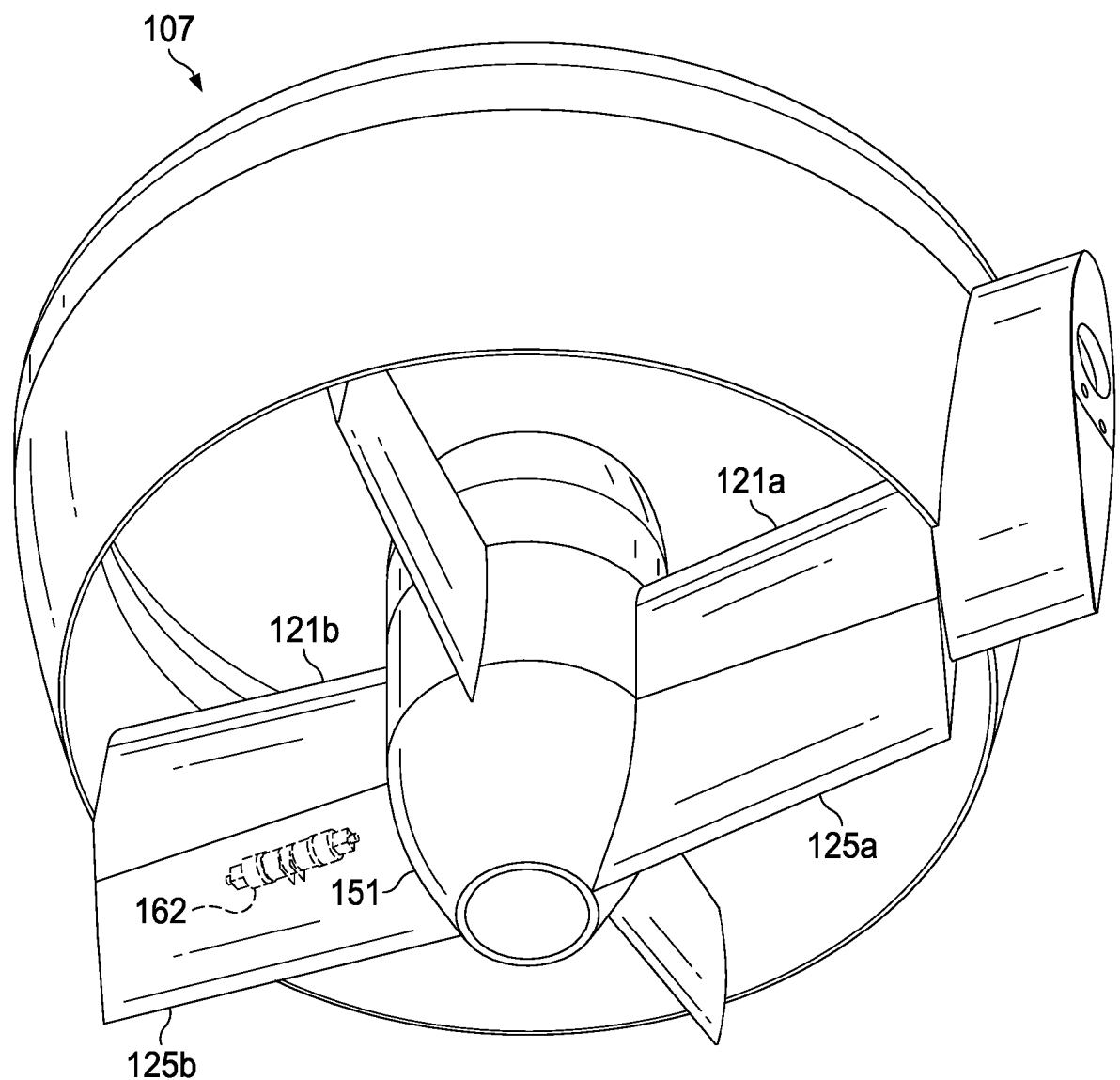
FIG. 5 illustrates a bottom perspective view of the duct depicted in FIG. 3.
Figure 6:
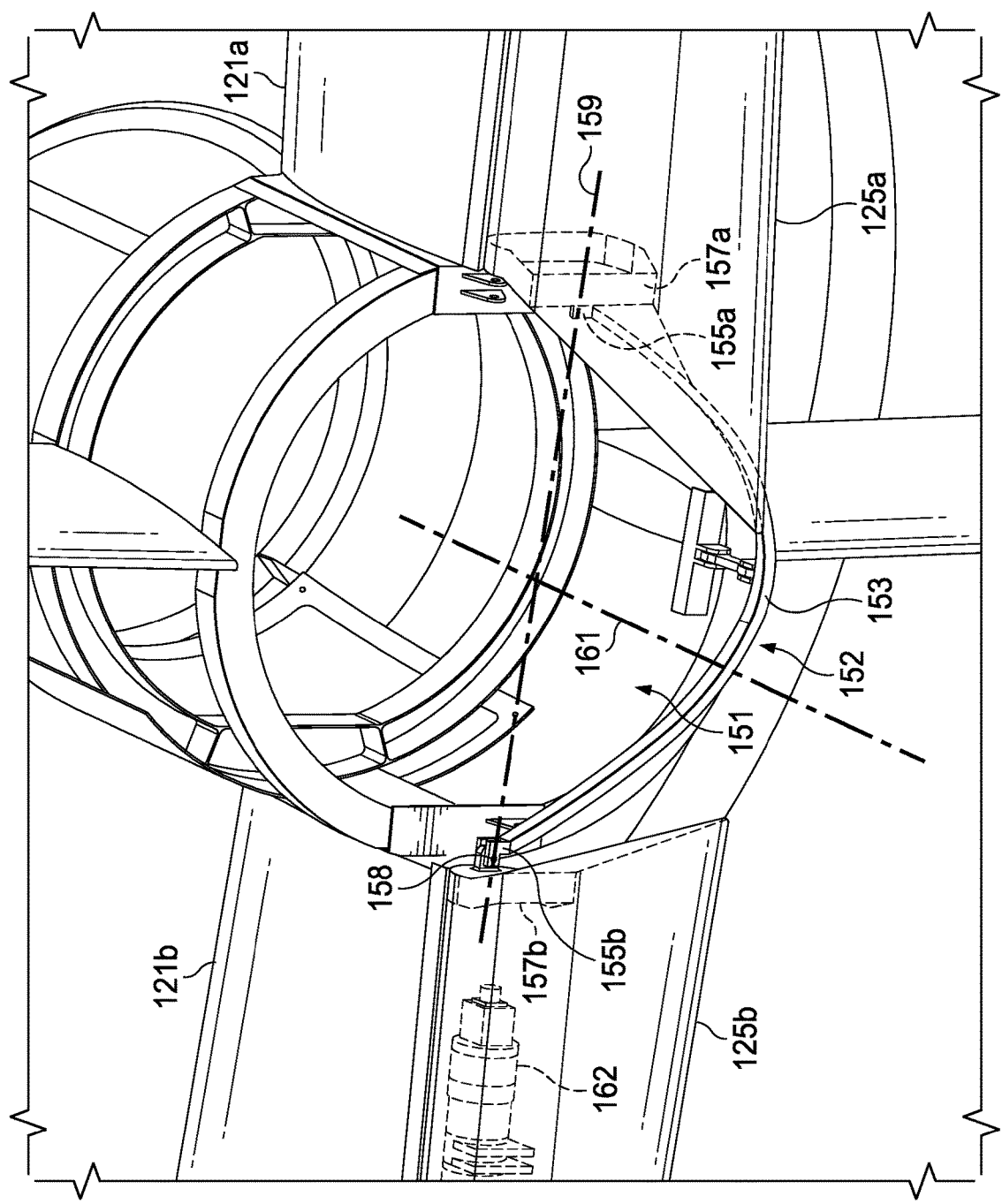
FIG. 6 a center body portion of the duct as depicted in FIG. 5 with an outer skin removed to illustrate internal components of the center body.

FIG. 5 is a bottom perspective view of duct 107 showing a center body 151 connected to hub 119. FIG. 6 illustrates a portion of duct 107 in which outer skin of center body 151 has been removed to expose an embodiment of a duct vane rotation system 152 including a structural hoop 153 disposed within center body 151 and having opposite ends connected to pitch horns 155a, 155b, provided on close out ribs 157a, 157b, of hub-facing ends of control vanes 125a, 125b, respectively. As will be illustrated and described in greater detail below, ends of structural hoop 153 are connected to pitch horns 155a, 155b, via spherical joints 158a, 158b, which may be implemented using spherical bearings, such that control vanes 125a, 125b, rotate around a hinge line axis 159, while structural hoop rotates about a duct centerline axis 161.

In accordance with features of an embodiment described herein, structural hoop 153 is a rigid element, which may be made of titanium or corrosion-resistant steel, for example. Pitch horns (or clevis ends) 155a, 155b, may be made of corrosion-resistant steel, for example. It will be recognized that the materials may be adjusted depending on the loads applied to the system 152. Closeout ribs 157a, 157b, may be aluminum machinings, for example, in which case pitch horns 155a, 155b, may be integral to the machinings.

An actuator 162 may be provided in connection with one of the control vanes (e.g., outboard control vane 125b) for directly controlling rotation of the control vane, with the rotation being translated to the other control vane (e.g., inboard control vane 125a) by duct vane rotation system 152. In certain embodiments, actuator 162 is a rotary actuator. As shown in FIGS. 5 and 6, actuator 162 is situated in outboard control vane 125b and is structurally mounted to both the vane structure and outboard primary stator 121b. A central component of actuator 162 rotates approximately +/−25 degrees, thereby rotating the vane structure the same amount. This is accomplished by a centerline of actuator 162 being collocated with hinge line axis 159. Outer components of actuator 162 remain stationary by virtue of the fact that they are attached to outboard primary stator 121.

Figure 7A:
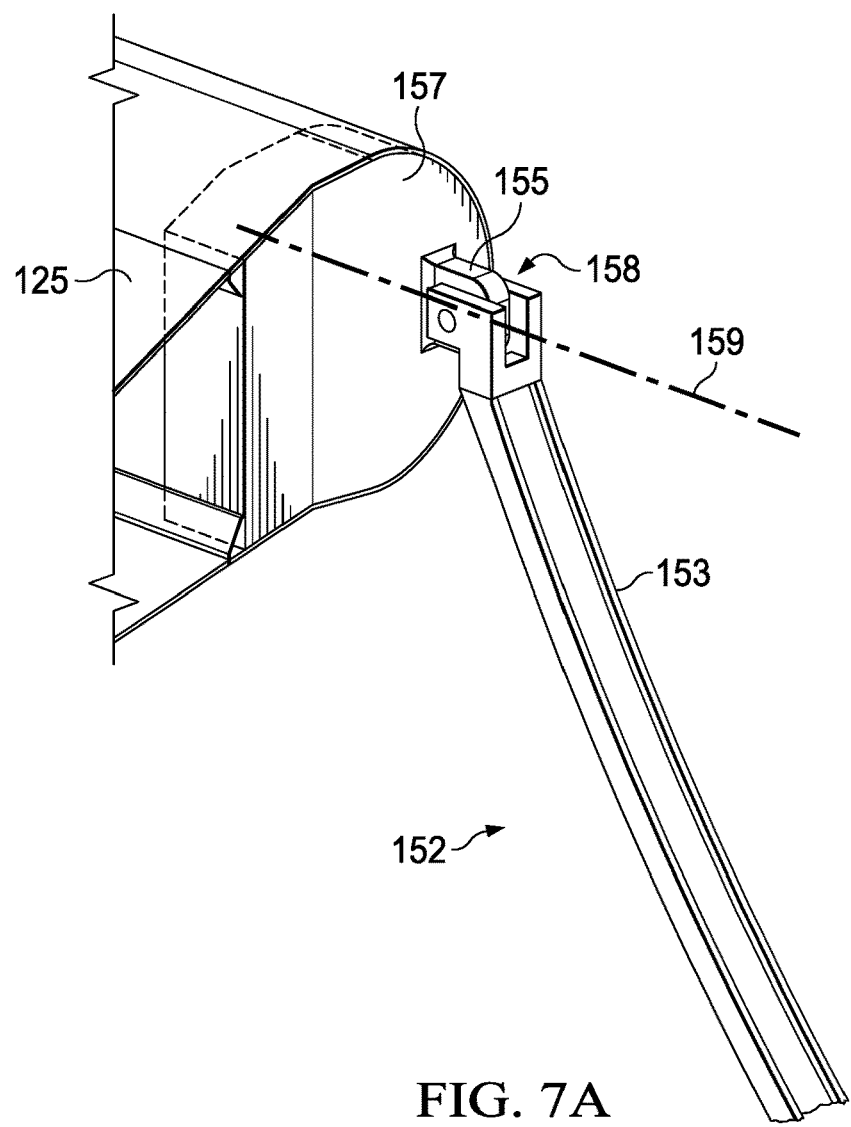
FIGS. 7A-8 and 10-12B are more detailed illustrations of the duct vane rotation system of the duct as depicted in FIG. 5.
Figure 7B:
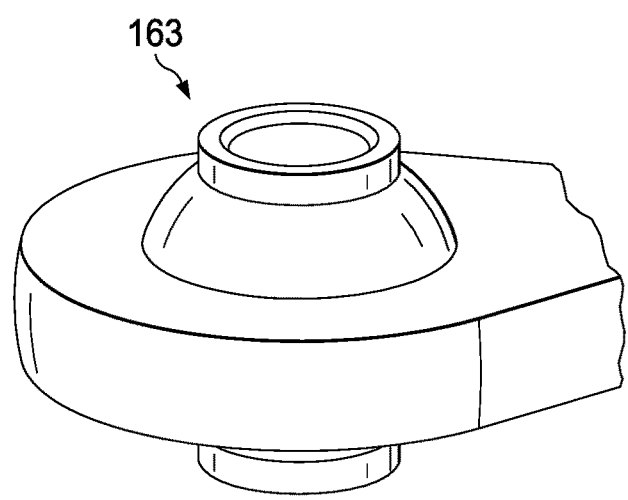

FIG. 7A is a more detailed depiction of duct vane rotation system 152 showing the connection of an end of structural hoop 153 to pitch horn 155 disposed on close out rib 157 of control vane 125 via a spherical joint 158 in accordance with certain embodiments. Referring also to FIG. 7B, in accordance with features of certain embodiments, spherical joint is implemented using a spherical bearing 163 that permits rotation of control vanes 125a, 125b about hinge line axis 159 and prevents hoop rotation about hinge line axis 159, thereby preserving space within center body 151.

In certain embodiments, spherical bearing 163 is located within the pitch horn 155, which in the illustrated embodiment comprises a U-mount. Bearing 163 bearing may be made of corrosion-resistant steel and may be self-lubricating and self-aligning. In certain embodiments, spherical bearing 163 is a "high misalignment" bearing, allowing for maximum spherical rotation. As a result, a ball portion of spherical bearing 163 is rounder and more exposed than other spherical bearings (e.g., low misalignment bearings). As a result, clevis ends of pitch horn 155 need only be about 1.5 inches apart to avoid interference during rotation. It will be recognized that a low misalignment bearing may also be used to implement spherical joint 158, with corresponding adjustments made in the distance between pitch horn clevis ends.

Figure 8:
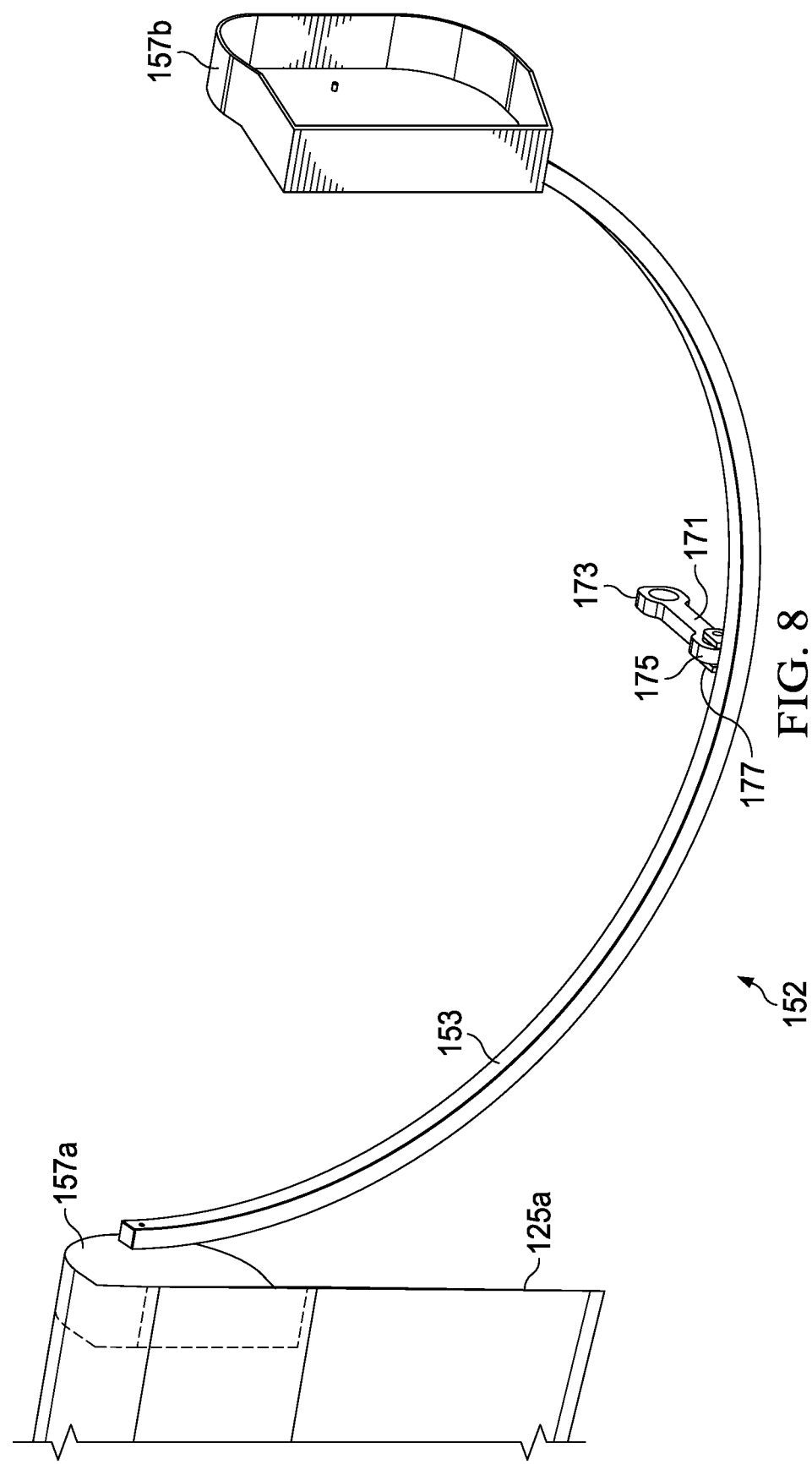

FIG. 8 illustrates additional details of duct vane system 152, including an idler 171 having an end 173 hingedly connected to a fixed point (e.g., on a structural element comprising a portion of the center body, as described in detail below) and an opposite end 175 hingedly connected to a connection point 177 comprising projections from a side of the structural hoop 153 disposed at or near the center of the hoop 153. As demonstrated below, idler 171 is connected such that it prevents rotation of the structural hoop 153 around hinge line axis 159 (FIG. 6) as well as around the hub axis by restricting forward-aft and side-to-side movement of the structural hoop 153 (with "forward movement" being defined as toward the front of the duct and "aft movement" being defined as toward the rear of the duct).

Figure 9B:
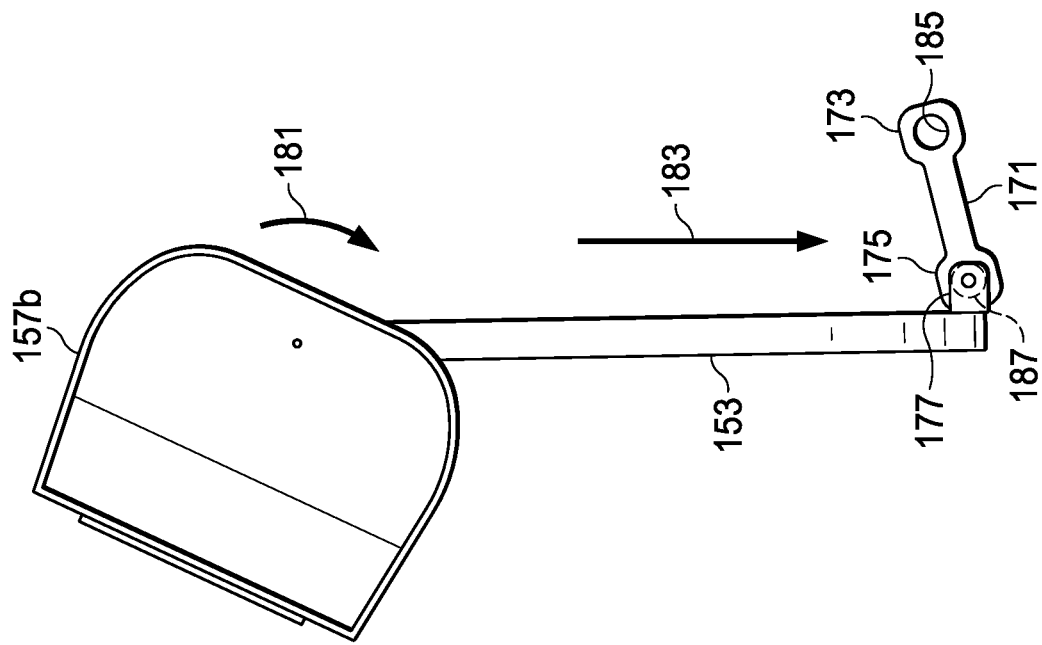
FIGS. 9A-9B illustrate relative positions of various structural elements of the duct as depicted in FIG. 5 when the duct vane rotation system is rotated about a vane hinge line axis to a maximum degree in a first (positive) direction.
Figure 9A:
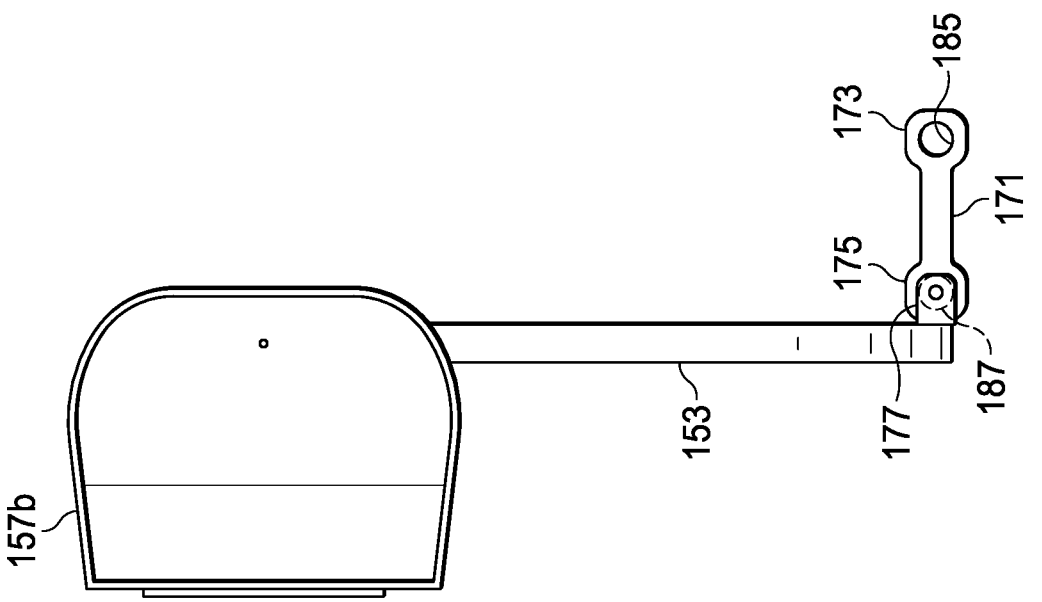

FIGS. 9A and 9B illustrate side cutaway views of duct vane system 152 illustrating various states during normal operation thereof. FIG. 9A illustrates a state of the system 152 in which there is no rotation of the vane and corresponding close out rib 157b. FIG. 9B illustrates a state of the system 152 in which the vane and corresponding close out rib 157b have rotated 25 degrees around hinge line axis 159 (FIG. 6) in a direction indicated by an arrow 181. As shown in FIG. 9B, the illustrated rotation of the close out rib 157b results in a corresponding linear translation of structural hoop 153 in the direction illustrated by an arrow 183. It will be recognized that rotation of close out rib 157b in a direction opposite that represented by arrow 181 will result in a corresponding linear translation of the structural hoop 153 in a direction opposite that represented by arrow 183. As best viewed in FIGS. 9A and 9B, openings 185, 187, are provided in ends 173, 175, of idler 171 for enabling connection to a fixed structure and to connection point 177 of structural hoop 153 as will be described in greater detail below.

Figure 10:
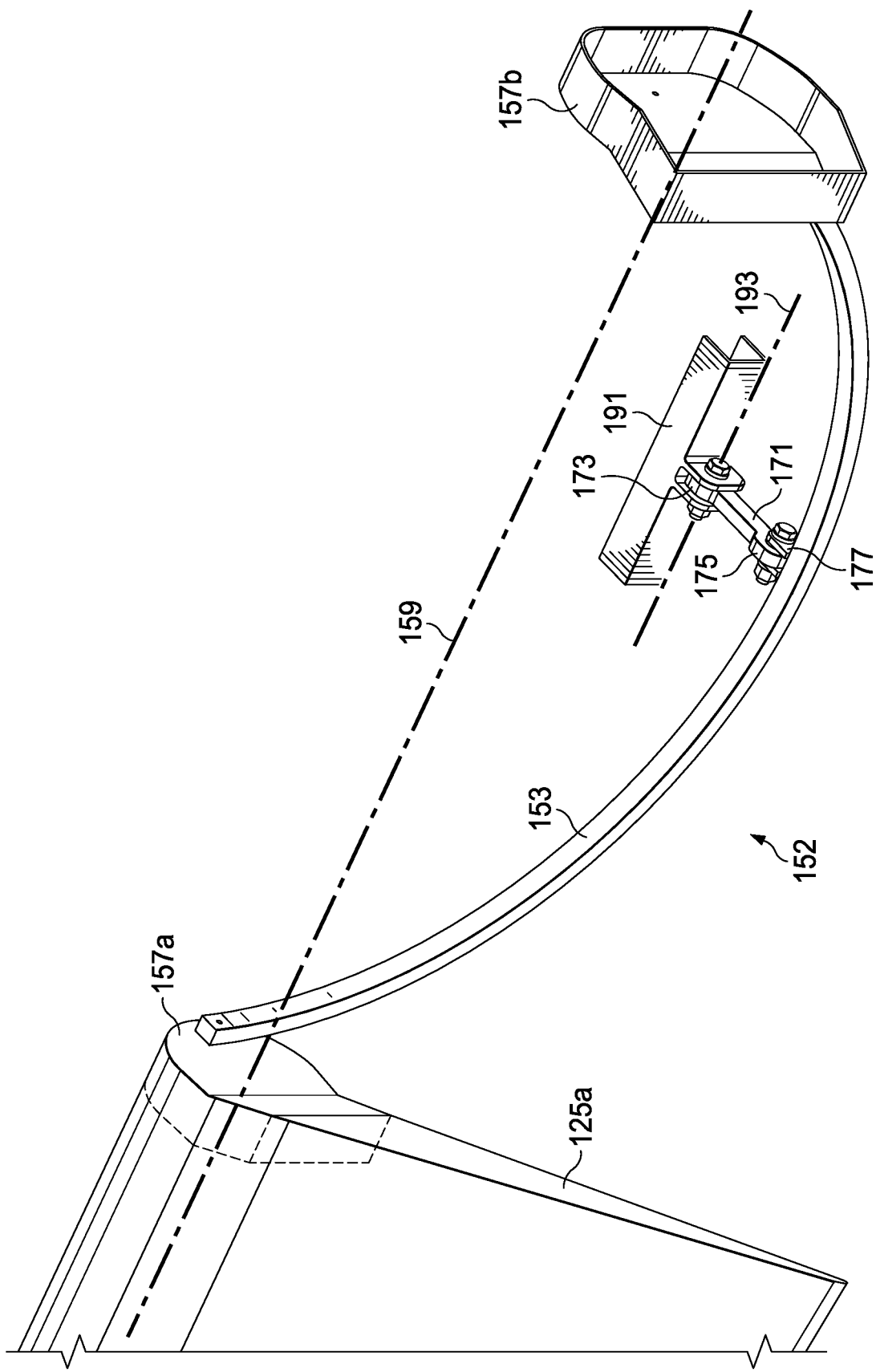

As shown in FIG. 10, as previously noted and as will be described and illustrated in greater detail below, end 173 of idler 171 is hingedly connected to a fixed structural element 191, which may comprise a portion of center body 151 (FIG. 6) in a manner that enables idler 171 to rotate around an idler axis 193 such that when vanes 125a, 125b/close out ribs 157a, 157b, rotate about hinge line axis 159, idler 171 rotates about idler axis 193 while restricting movement of structural hoop 153 via the hinged connection between idler end 175 and connection point 177. In particular, structural hoop 153 is restricted by idler 171 to primarily up and down movement.

Figure 11:
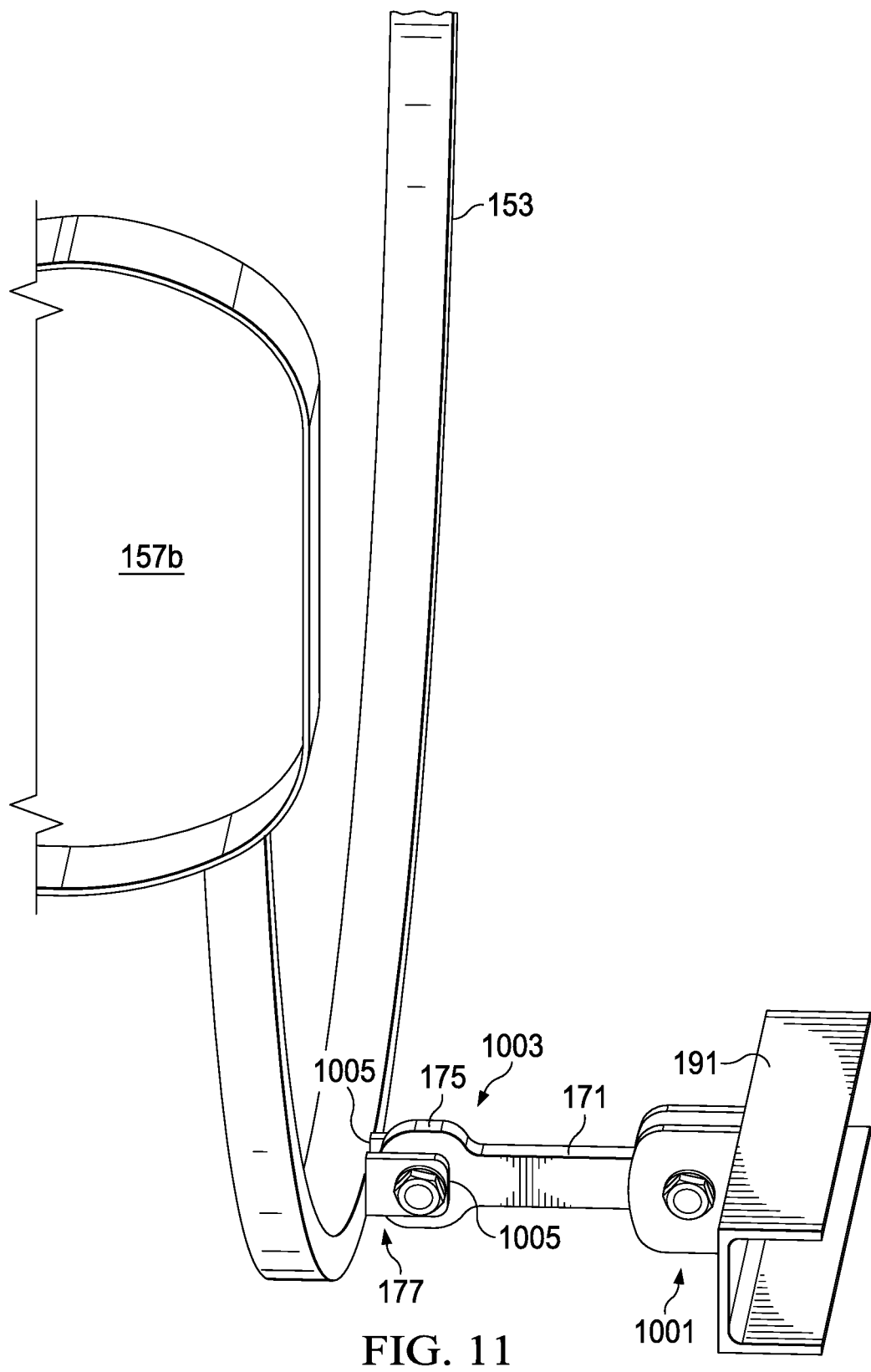
Figure 12A:
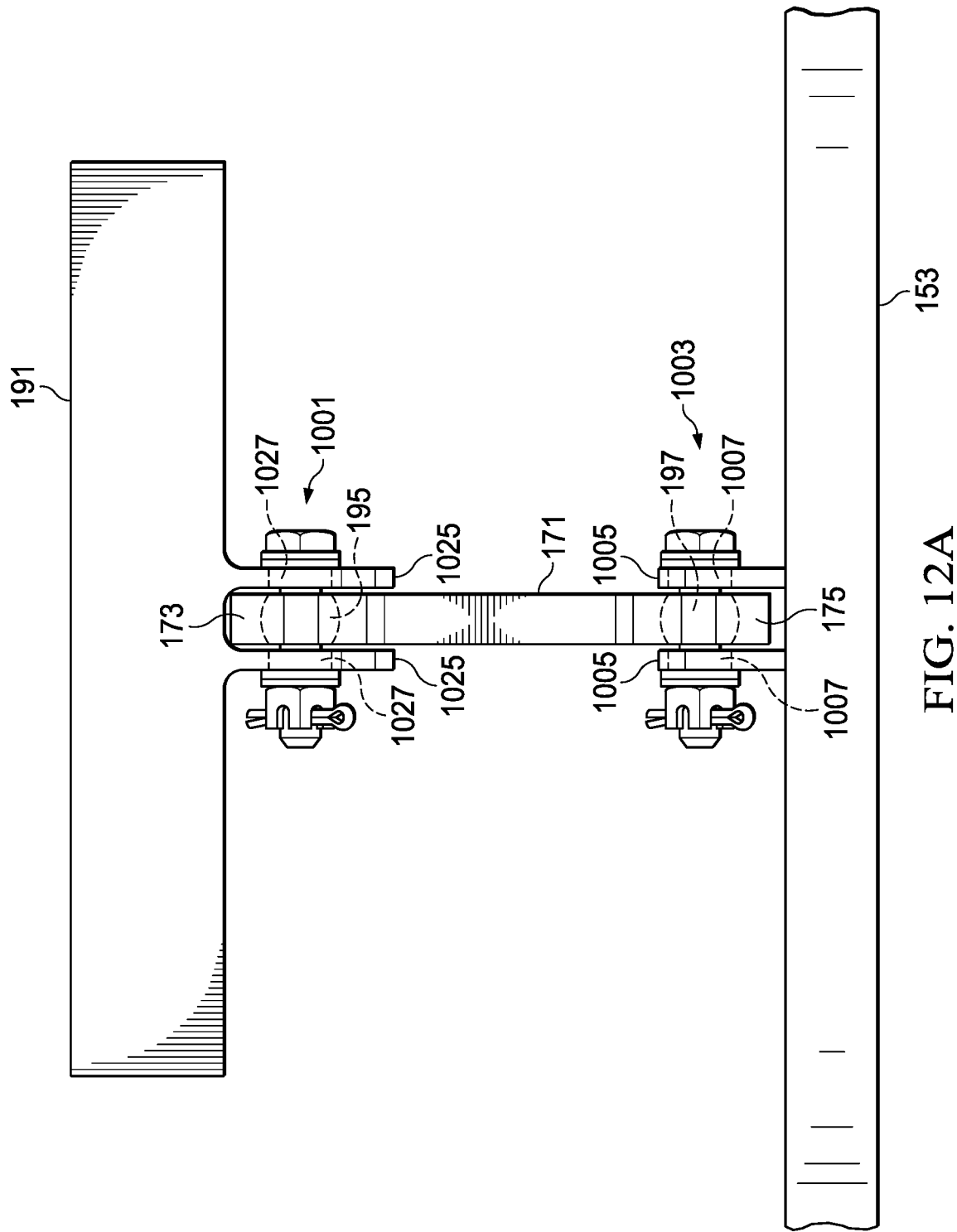
Figure 12B:
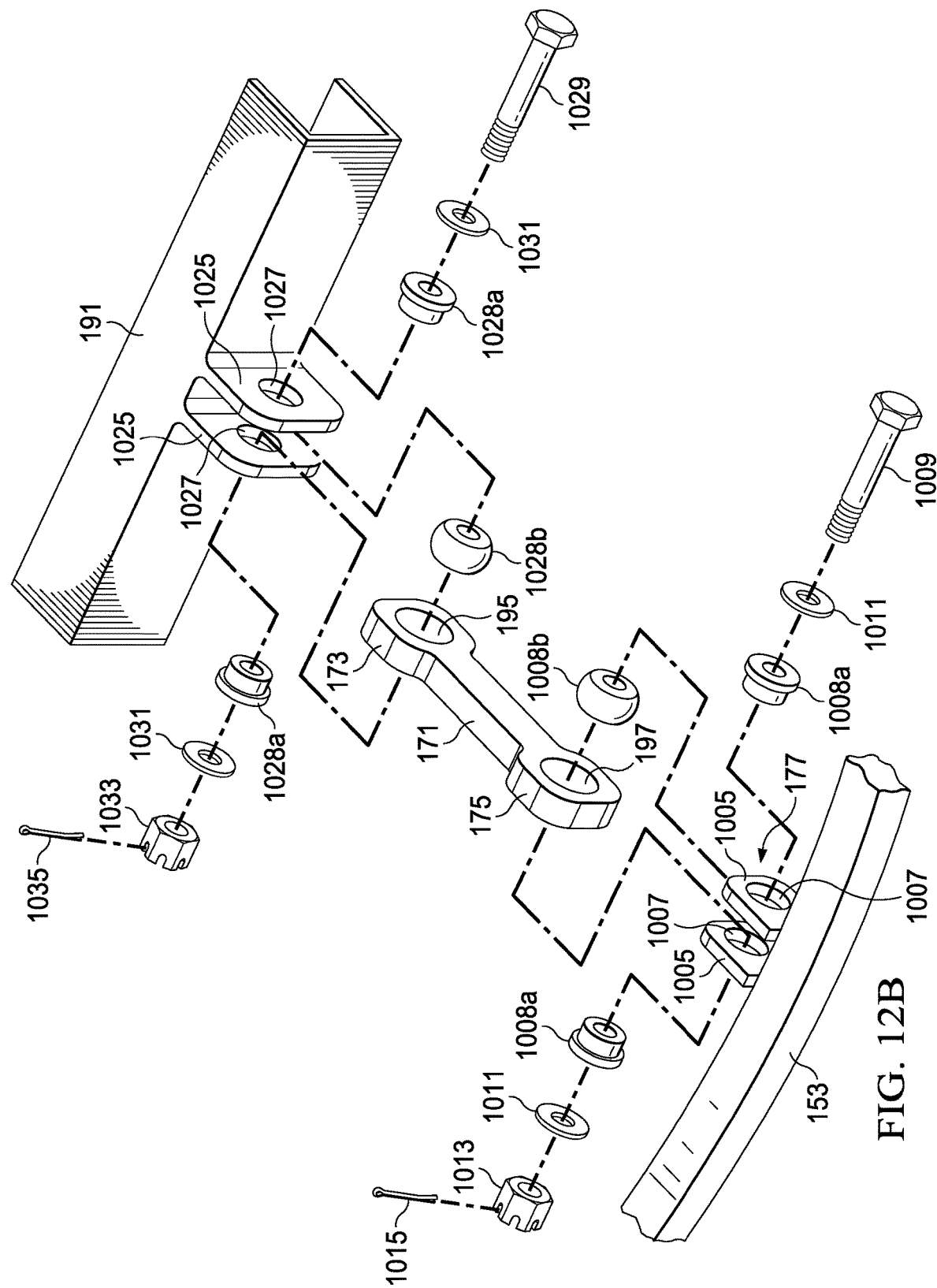

FIGS. 11, 12A, and 12B illustrate in greater detail example mechanisms for implementing hinged joints 1001, 1003, by which idler 171 is connected to fixed structural element 191 and structural hoop 153 at opposite ends 173, 175, thereof. As best shown in FIG. 12B, connection point 177 includes a pair of protrusions 1005 extending from a side of structural hoop 153 and defining a space for receiving end 175 of idler 171. Openings 1007 provided in protrusions 1005 align with opening 197 in end 175 when end is received between protrusions. In certain embodiments, each opening 1007 has a bushing 1008a disposed therein and opening 197 has a spherical bearing 1008b disposed therein. A bolt 1009 is provided through aligned openings 1007, 197. Washers 1011 may be provided on each end of bolt 1009 and a castellated nut 1013 may be provided on the end of the bolt for securing the bolt 1009. A pin 1015 may also be provided as a secondary lock.

Similarly, fixed structural element 191 includes a pair of protrusions 1025 extending from a face of fixed structural element and defining a space for receiving end 173 of idler 171. Openings 1027 provided in protrusions 1025 align with opening 195 in end 173 when end is received between protrusions. In certain embodiments, each opening 1027 has a bushing 1028a disposed therein and opening 195 has a spherical bearing 1028b disposed therein. A bolt 1029 is provided through aligned openings 1027, 195. Washers 1031 may be provided on each end of bolt 1029 and a castellated nut 1033 may be provided on the end of the bolt for securing the bolt 1029. A pin 1035 may also be provided as a secondary lock.

Figure 13:
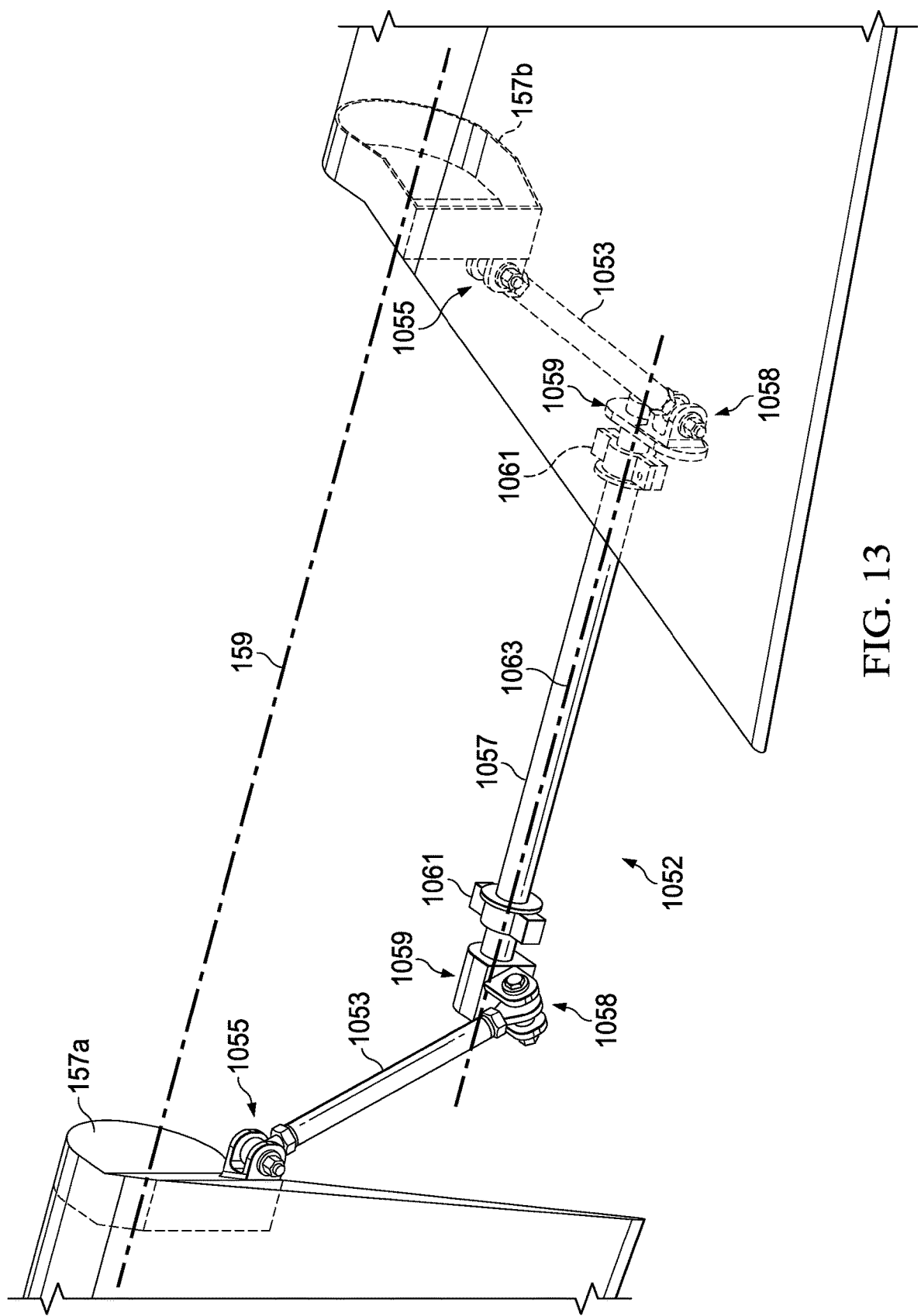
FIGS. 13-16 illustrate an alternative embodiment of a duct vane rotation system embodying features described herein.

FIG. 13 illustrates an alternative embodiment of a duct vane rotation system 1052 which may be deployed in place of system 152 shown in FIG. 6. In accordance with features of an alternative embodiment described herein, and similar to the system 152, the duct vane rotation system 1052 allows for vane rotation of +/−25 degrees about the vane hinge line axis 159. Unlike the system 152, and as described and illustrated below, system 1052 incorporates sway bar technology to mechanically connect the two duct vanes so that their rotational motion is identical and in a manner in which mechanical elements thereof do not interfere with the motor assembly disposed within the center body 151 of the duct 107.

As illustrated in FIG. 13, duct vane rotation system 1052 includes vane linkage members 1053 each having one end connected to one of close out ribs 157 via spherical bearings 1055 and an opposite end connected to opposite ends of a torque tube 1057 via spherical bearings 1058 and bell crank mechanisms 1059. Torque tube 1057 is affixed to one or more fixed structural elements of center body 151 via pillow blocks 1061 having internal bearings. Pillow blocks fix 1061 fix restrict movement of torque tube 1057 to rotation about a torque tube axis 1063. This is accomplished using a high diameter bearing housed in the pillow block, with the torque tube going through the internal diameter of the bearing, much like a bolt typically would.

In operation, vane linkage members 1053 carry the up-down motion caused by vane rotation through bell crank mechanisms 1059 (or other mechanisms that transfer motion through an angle) to torque tube 1057, causing the torque tube to rotate and thereby translate motion to the opposite bell crank mechanism 1059 and vane linkage member 1053 and ultimately to the opposite vane.

Figure 14:
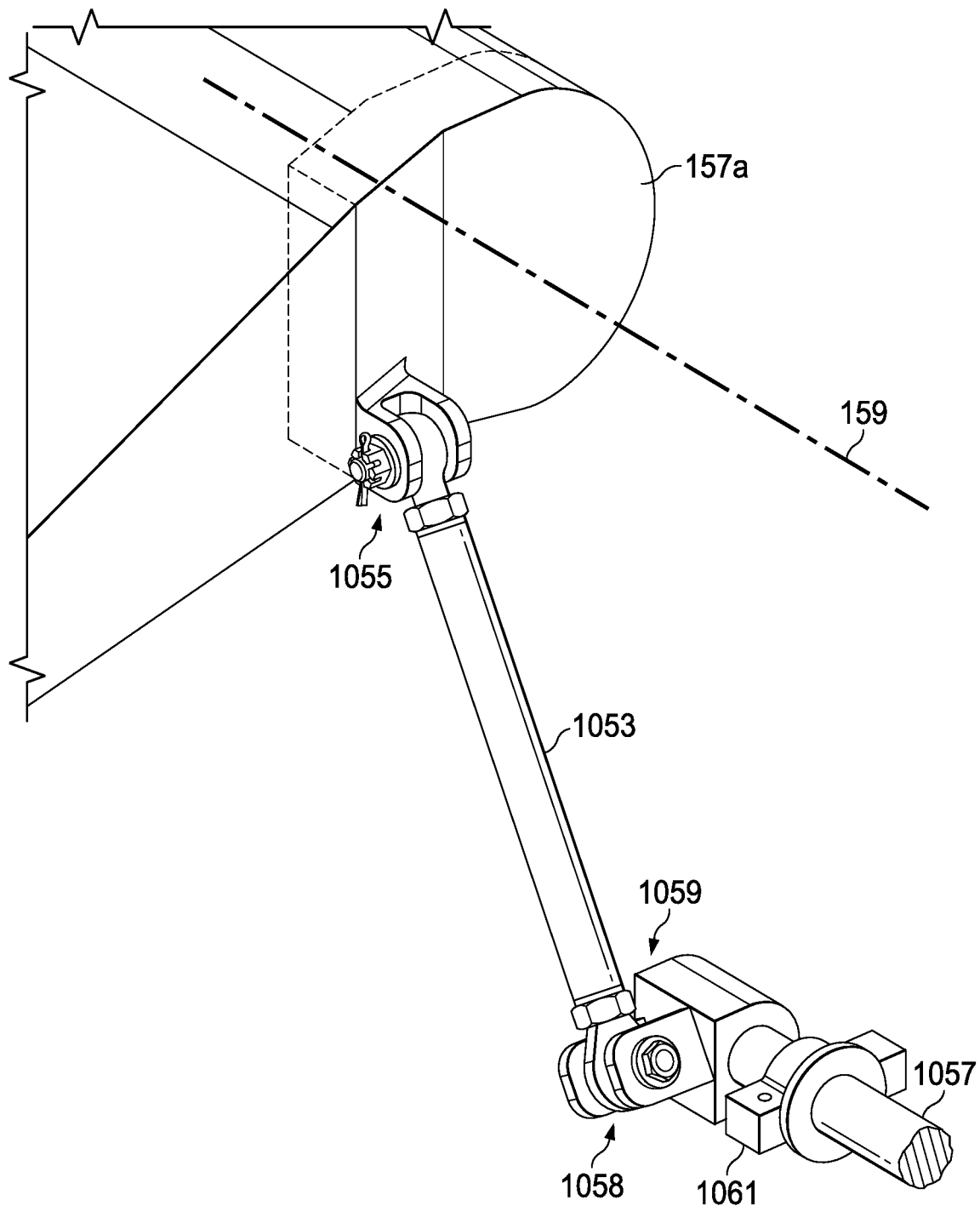

FIG. 14 is a close-up view of connection of vane linkage member 1053 to close out rib 157a and torque tube 1057 via spherical joints, or spherical bearings 1055, 1058, and bell crank mechanism 1059. Spherical bearings 1055, 1058, may be configured and operate similarly or identically to spherical bearing 163 as shown in FIG. 7B.

Figure 15:
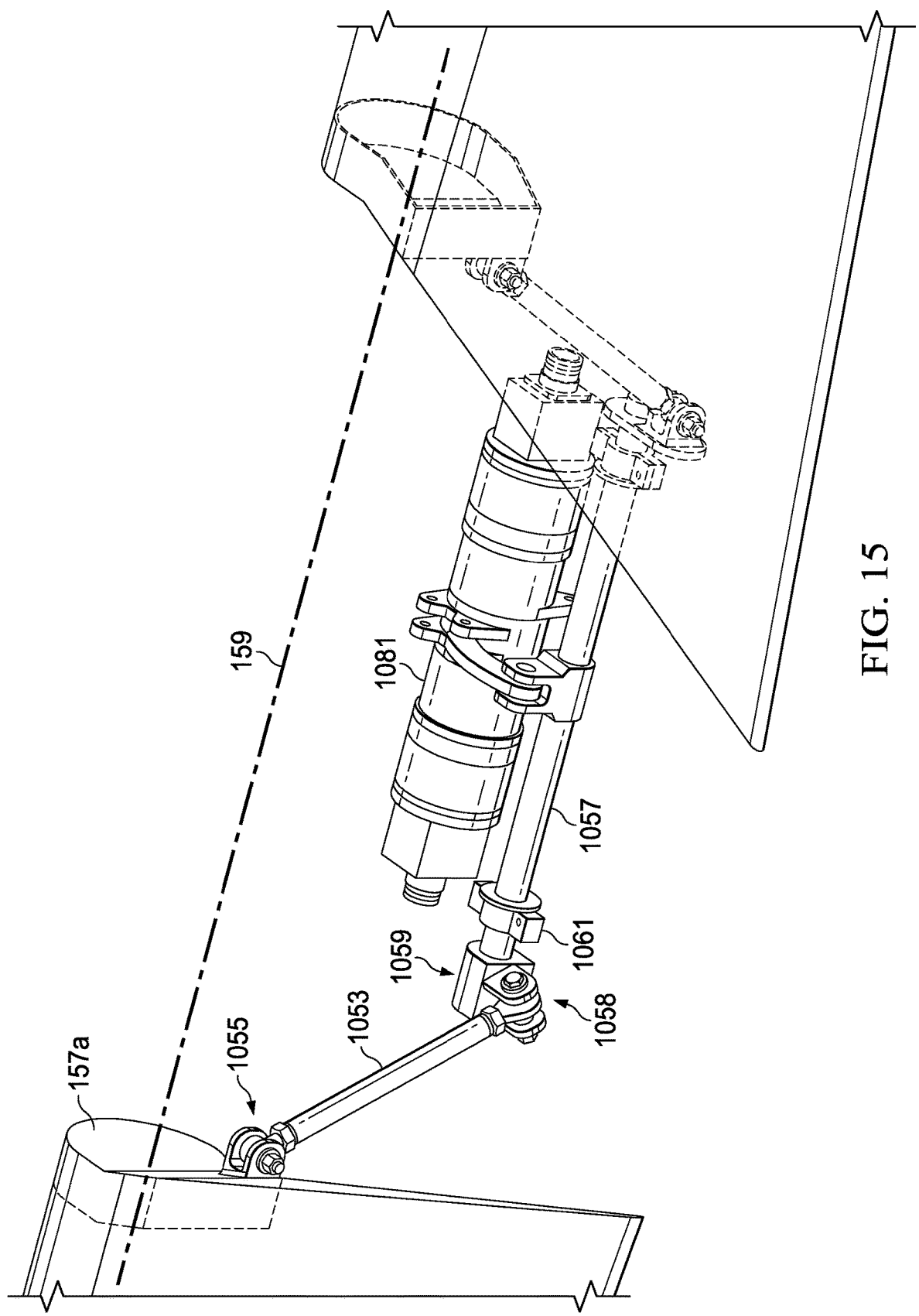

In accordance with certain embodiments, and as illustrated in FIG. 15, system 1052 may include an actuator 1081 disposed within center body 151 (FIG. 5) for rotating the torque tube 1057, thereby to allow rotational motion to originate directly from the torque tube 1057 and be transferred to the vanes via vane linkages 1053. In this embodiment, actuator 1081 may replace actuator 162 disposed in one of the vanes (e.g., outboard vane 125b), as illustrated in FIG. 5. In certain embodiments, actuator 1081 is a rotary actuator and is structurally mounted to a fixed structural element within the center body 151 (FIG. 5). Actuator 1081 is connected to torque tube 1057 such that it is capable of rotating torque tube approximately +/−25 degrees about torque tube axis 1063 (FIG. 14), thereby rotating the vanes (via vane linkages 1053 and close out ribs 157) the same amount.

Figure 16:
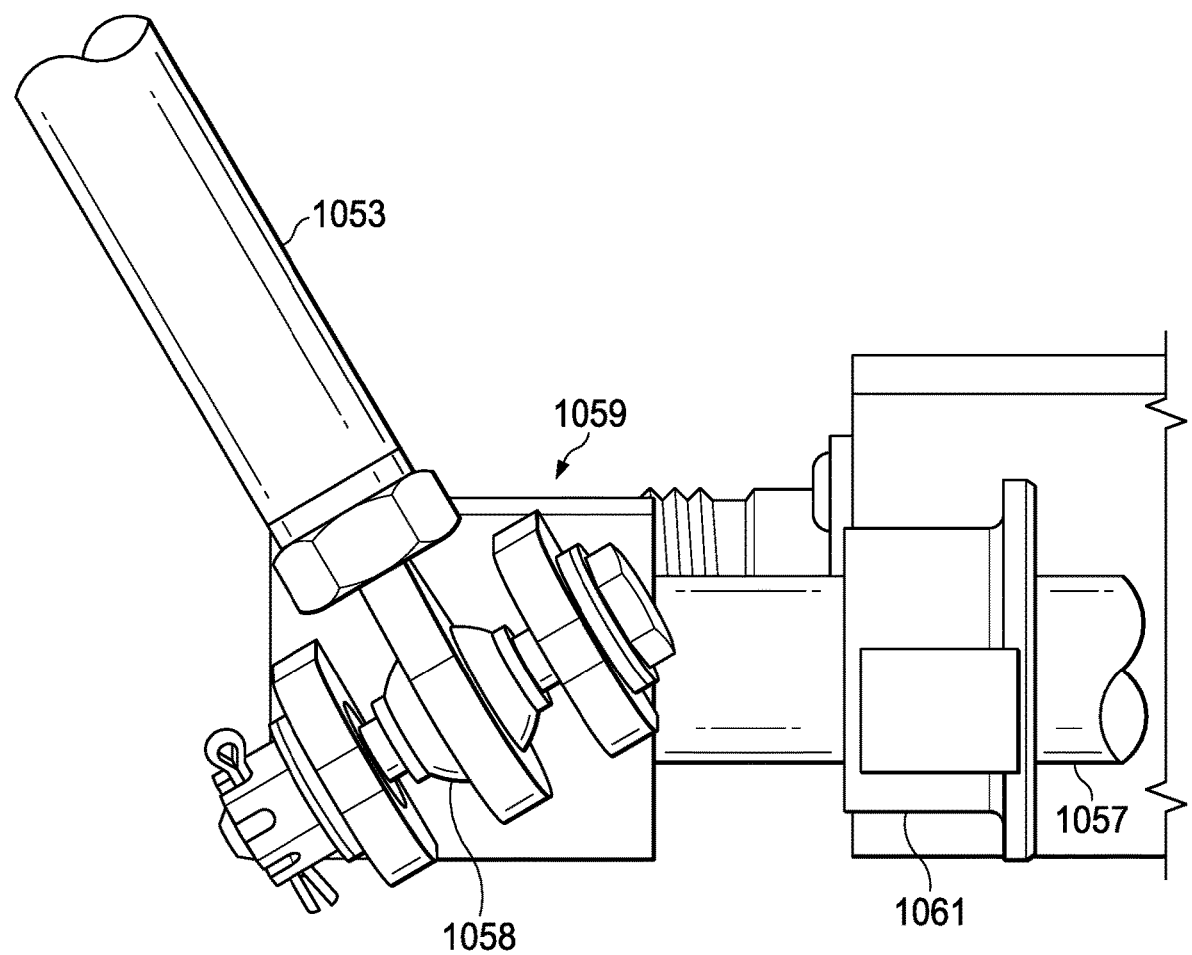

FIG. 16 is a more detailed view of the connection between vane linkage member 1053 and torque tube 1057 via spherical bearing 1058 and bell crank 1059. In the illustrated embodiment, the bell crank 1059 utilizes a high-misalignment bearing, bolt, bushing, washers, and nut (similar to the arrangement used in the idler/structural hoop joint described above) to connect the vane linkage to the bell crank 1059. The bell crank 1059 is then fixedly connected to the torque tube 1057, which is fixed to its torque tube axis, such that when the bell crank 1059 is acted upon by the vane linkage member 1053 moving upward/downward, an aft protrusion of the bell crank 1059 moves upward/downward with the vane linkage member 1053 and a fixed section of the bell crank 1059 rotates about the fixed torque tube axis, which makes the attached torque tube 1057 rotate in the same manner due to the connection therebetween.

Example 1 is a rotor system including a duct ring; a hub disposed centrally to the duct ring; first and second stators each connected between the duct ring and the hub; first and second control vanes rotatably connected to the first and second stators, respectively; a structural hoop having a first end connected to the first control vane and a second end connected to the second control vane, the structural hoop for translating rotation of the first control vane about a vane axis to the second control vane; and a mechanism for restricting at least one of forward-aft movement and side-to-side movement of the structural hoop relative to the duct ring.

In Example 2, the rotor system of Example 1 may further include the mechanism for restricting at least one of forward-aft movement and side-to-side movement including an idler having first and second ends, the first end of the idler rotatably connected to a fixed structure within the rotor system and the second end of the idler rotatably connected to the structural hoop.

In Example 3, the rotor system of any of Examples 1-2 may further include a torque tube; and first and second vane linkages each having first ends respectively rotatably connected to first and second ends of the torque tube and second ends rotatably connected to the duct vanes.

In Example 4, the rotor system of any of Examples 1-3 may further include the first ends of the first and second vane linkages being connected to the first and second ends of the torque tube via spherical joints.

In Example 5, the rotor system of any of Examples 1-4 may further include the first ends of the first and second vane linkages being connected to the first and second ends of the torque tube via bell cranks.

In Example 6, the rotor system of any of Examples 1-5 may further include the mechanism for restricting at least one of forward-aft movement and side-to-side movement of the structural hoop including a pillow block for connecting the torque tube to a fixed structure within the rotor system.

In Example 7, the rotor system of any of Examples 1-6 may further include an actuator for rotating the torque tube.

In Example 8, the rotor system of any of Examples 1-7 may further include the spherical joints including high misalignment bearings.

In Example 9, the rotor system of any of Examples 1-8 may further include the first and second control vanes being rotatable approximately ±25 degrees about a hinge line axis.

Example 10 is an aircraft including a fuselage; and a rotor system including a duct ring; a hub disposed centrally to the duct ring; first and second stators each connected between the duct ring and the hub; first and second control vanes rotatably connected to the first and second stators, respectively; a structural hoop having a first end connected to the first control vane and a second end connected to the second control vane, the structural hoop for translating rotation of the first control vane about a vane axis to the second control vane; and a mechanism for restricting at least one of forward-aft movement and side-to-side movement of the structural hoop relative to the duct ring.

In Example 11, the aircraft of Example 10 may further include the mechanism for restricting at least one of forward-aft movement and side-to-side movement comprising an idler having first and second ends, the first end of the idler rotatably connected to a fixed structure within the rotor system and the second end of the idler rotatably connected to the structural hoop.

In Example 12, the aircraft of any of Examples 10-11 may further include the structural hoop further including a torque tube and first and second vane linkages each having first ends respectively rotatably connected to first and second ends of the torque tube and second ends rotatably connected to the duct vanes.

In Example 13, the aircraft of any of Examples 10-12 may further include the first ends of the first and second vane linkages being connected to the first and second ends of the torque tube via spherical joints.

In Example 14, the aircraft of any of Examples 10-13 may further include the first ends of the first and second vane linkages being connected to the first and second ends of the torque tube via bell cranks.

In Example 15, the aircraft of any of Examples 10-14 may further include the mechanism for restricting at least one of forward-aft movement and side-to-side movement of the structural hoop including a pillow block for connecting the torque tube to a fixed structure within the aircraft.

In Example 16, the aircraft of any of Examples 10-15 may further include an actuator for rotating the torque tube.

In Example 17, the aircraft of any of Examples 10-16 may further include the spherical joints comprising high misalignment bearings.

In Example 18, the aircraft of any of Examples 10-17 may further include the first and second control vanes being rotatable approximately ±25 degrees about a hinge line axis.

Example 19 is a ducted rotor including first and second control vanes rotatable about a hinge line axis; a structural hoop having a first end connected to the first control vane and a second end connected to the second control vane, the structural hoop for translating rotation of the first control vane about a vane axis to the second control vane; and a mechanism for restricting rotation of the structural hoop about the hinge line axis.

In Example 20, the ducted rotor of Example 19 may further include the mechanism for restricting rotation including at least one of an idler having first and second ends, the first end of the idler rotatably connected to a fixed structure within the ducted rotor and the second end of the idler rotatably connected to the structural hoop; and a pillow block for connecting a portion of the structural hoop to the fixed structure.

It should be appreciated that aircraft illustrated herein, such as aircraft 101, is merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system comprising:
    a duct ring;
    a hub disposed centrally to the duct ring;
    first and second stators each connected between the duct ring and the hub;
    first and second control vanes rotatably connected to the first and second stators, respectively;
    a structural hoop having a first end connected to the first control vane and a second end connected to the second control vane, the structural hoop for translating rotation of the first control vane about a vane axis to the second control vane; and
    a mechanism for restricting at least one of forward-aft movement and side-to-side movement of the structural hoop relative to the duct ring.

2. The rotor system of claim 1, wherein the mechanism for restricting at least one of forward-aft movement and side-to-side movement comprises an idler having first and second ends, the first end of the idler rotatably connected to a fixed structure within the rotor system and the second end of the idler rotatably connected to the structural hoop.

3. The rotor system of claim 1, wherein the structural hoop further comprises:
    a torque tube; and
    first and second vane linkages each having first ends respectively rotatably connected to first and second ends of the torque tube and second ends rotatably connected to the duct vanes.

4. The rotor system of claim 3, wherein the first ends of the first and second vane linkages are connected to the first and second ends of the torque tube via spherical joints.

5. The rotor system of claim 3, wherein the first ends of the first and second vane linkages are connected to the first and second ends of the torque tube via bell cranks.

6. The rotor system of claim 3 wherein the mechanism for restricting at least one of forward-aft movement and side-to-side movement of the structural hoop comprises a pillow block for connecting the torque tube to a fixed structure within the rotor system.

7. The rotor system of claim 3 further comprising an actuator for rotating the torque tube.

8. The rotor system of claim 4, wherein the spherical joints comprise high misalignment bearings.

9. The rotor system of claim 1, wherein the first and second control vanes are rotatable approximately ±25 degrees about a hinge line axis.

10. An aircraft comprising:
    a fuselage; and
    a rotor system comprising:
        a duct ring;
        a hub disposed centrally to the duct ring;
        first and second stators each connected between the duct ring and the hub;
        first and second control vanes rotatably connected to the first and second stators, respectively;
        a structural hoop having a first end connected to the first control vane and a second end connected to the second control vane, the structural hoop for translating rotation of the first control vane about a vane axis to the second control vane; and
        a mechanism for restricting at least one of forward-aft movement and side-to-side movement of the structural hoop relative to the duct ring.

11. The aircraft of claim 10, wherein the mechanism for restricting at least one of forward-aft movement and side-to-side movement comprises an idler having first and second ends, the first end of the idler rotatably connected to a fixed structure within the rotor system and the second end of the idler rotatably connected to the structural hoop.

12. The aircraft of claim 10, wherein the structural hoop further comprises:
    a torque tube; and
    first and second vane linkages each having first ends respectively rotatably connected to first and second ends of the torque tube and second ends rotatably connected to the duct vanes.

13. The aircraft of claim 12, wherein the first ends of the first and second vane linkages are connected to the first and second ends of the torque tube via spherical joints.

14. The aircraft of claim 12, wherein the first ends of the first and second vane linkages are connected to the first and second ends of the torque tube via bell cranks.

15. The aircraft of claim 12 wherein the mechanism for restricting at least one of forward-aft movement and side-to-side movement of the structural hoop comprises a pillow block for connecting the torque tube to a fixed structure within the aircraft.

16. The aircraft of claim 12 further comprising an actuator for rotating the torque tube.

17. The aircraft of claim 13, wherein the spherical joints comprise high misalignment bearings.

18. The aircraft of claim 10, wherein the first and second control vanes are rotatable approximately ±25 degrees about a hinge line axis.

19. A ducted rotor comprising:
    first and second control vanes rotatable about a hinge line axis;
    a structural hoop having a first end connected to the first control vane and a second end connected to the second control vane, the structural hoop for translating rotation of the first control vane about a vane axis to the second control vane; and
    a mechanism for restricting rotation of the structural hoop about the hinge line axis.

20. The ducted rotor of claim 19 wherein the mechanism for restricting rotation comprises at least one of:
    an idler having first and second ends, the first end of the idler rotatably connected to a fixed structure within the ducted rotor and the second end of the second end of the idler rotatable connected to the structural hoop; and
    a pillow block for connecting a portion of the structural hoop to the fixed structure.

* * * * *

UNITED STATES PATENT AND TRADEMARK OFFICE
CERTIFICATE OF CORRECTION

| | |
|---|---|
| PATENT NO. | : 11,453,491 B2 |
| APPLICATION NO. | : 17/173860 |
| DATED | : September 27, 2022 |
| INVENTOR(S) | : Elizabeth Feeley et al. |

It is certified that error appears in the above-identified patent and that said Letters Patent is hereby corrected as shown below:

In the Claims

Column 14 Lines 61 and 62 - Claim 20, delete: "ducted rotor and the second end of the second end of the idler rotatable connected to the strutural hoop" and insert -- "ducted rotor and the second end of the idler rotatably connected to the structural hoop;" --

Signed and Sealed this
Twenty-second Day of November, 2022

Katherine Kelly Vidal
*Director of the United States Patent and Trademark Office*